United States Patent
Yoshizawa et al.

(10) Patent No.: US 11,297,242 B2
(45) Date of Patent: Apr. 5, 2022

(54) IMAGING APPARATUS WHICH GENERATES TITLE IMAGES FOR CLASSIFYING A PLURALITY OF CAPTURED IMAGES AND INSERTS THE TITLE IMAGES AS SEPARATE IMAGES WITHIN THE PLURALITY OF CAPTURED IMAGES

(71) Applicant: Maxell, Ltd., Kyoto (JP)

(72) Inventors: Kazuhiko Yoshizawa, Kyoto (JP); Hiroshi Shimizu, Kyoto (JP); Akira Ishiyama, Kyoto (JP)

(73) Assignee: MAXELL, LTD., Kyoto (JP)

( * ) Notice: Subject to any disclaimer, the term of this patent is extended or adjusted under 35 U.S.C. 154(b) by 0 days.

(21) Appl. No.: 16/477,536

(22) PCT Filed: Feb. 23, 2017

(86) PCT No.: PCT/JP2017/006823
§ 371 (c)(1),
(2) Date: Jul. 12, 2019

(87) PCT Pub. No.: WO2018/154675
PCT Pub. Date: Aug. 30, 2018

(65) Prior Publication Data
US 2020/0236295 A1 Jul. 23, 2020

(51) Int. Cl.
*H04N 5/225* (2006.01)
*H04N 5/232* (2006.01)
*G06K 9/62* (2022.01)

(52) U.S. Cl.
CPC ..... *H04N 5/232939* (2018.08); *G06K 9/6267* (2013.01)

(58) Field of Classification Search
None
See application file for complete search history.

(56) References Cited

U.S. PATENT DOCUMENTS

2005/0237391 A1* 10/2005 Shibuya ............. H04N 1/00161
348/207.1
2006/0022961 A1* 2/2006 Kaminaga .......... H04N 1/00458
345/173
(Continued)

FOREIGN PATENT DOCUMENTS

CN 101320385 A 12/2008
JP 2006-85632 A 3/2006
(Continued)

OTHER PUBLICATIONS

International Search Report of PCT/JP2017/006823 dated May 9, 2017.
(Continued)

*Primary Examiner* — Twyler L Haskins
*Assistant Examiner* — Dwight Alex C Tejano
(74) *Attorney, Agent, or Firm* — Mattingly & Malur, PC

(57) ABSTRACT

An imaging apparatus includes imaging units that image a subject, a title generation executing unit that generates title images each including a display title for classifying a plurality of captured images acquired by the imaging unit and inserts the title image into the captured images, a storage unit that stores the captured images and the title images, a display unit that displays the captured images and the title images stored in the storage unit in the form of a list, and an image search executing unit that searches for a desired captured image from the plurality of captured images and the title images displayed on the display unit in the form of the list. The title generation executing unit hierarchically generates the title images in accordance with a priority set in each type of display title for classifying the captured images.

10 Claims, 18 Drawing Sheets

(56) References Cited

U.S. PATENT DOCUMENTS

| | | | |
|---|---|---|---|
| 2006/0023261 A1* | 2/2006 | Kaminaga | H04N 1/00466 |
| | | | 358/302 |
| 2007/0199033 A1* | 8/2007 | Nakagawa | H04N 1/00132 |
| | | | 725/105 |
| 2008/0301586 A1 | 12/2008 | Ayatsuka et al. | |
| 2009/0051700 A1* | 2/2009 | Araki | G06F 16/70 |
| | | | 345/619 |
| 2017/0223268 A1* | 8/2017 | Shimmoto | H04N 5/23206 |

FOREIGN PATENT DOCUMENTS

| | | |
|---|---|---|
| JP | 2007-82076 A | 3/2007 |
| JP | 2008-141270 A | 6/2008 |
| JP | 2009-89325 A | 4/2009 |
| JP | 2009-141426 A | 6/2009 |
| JP | 2010-50705 A | 3/2010 |

OTHER PUBLICATIONS

Chinese Office Action received in corresponding Chinese Application No. 201780087154.0 dated Jul. 13, 2020.

\* cited by examiner

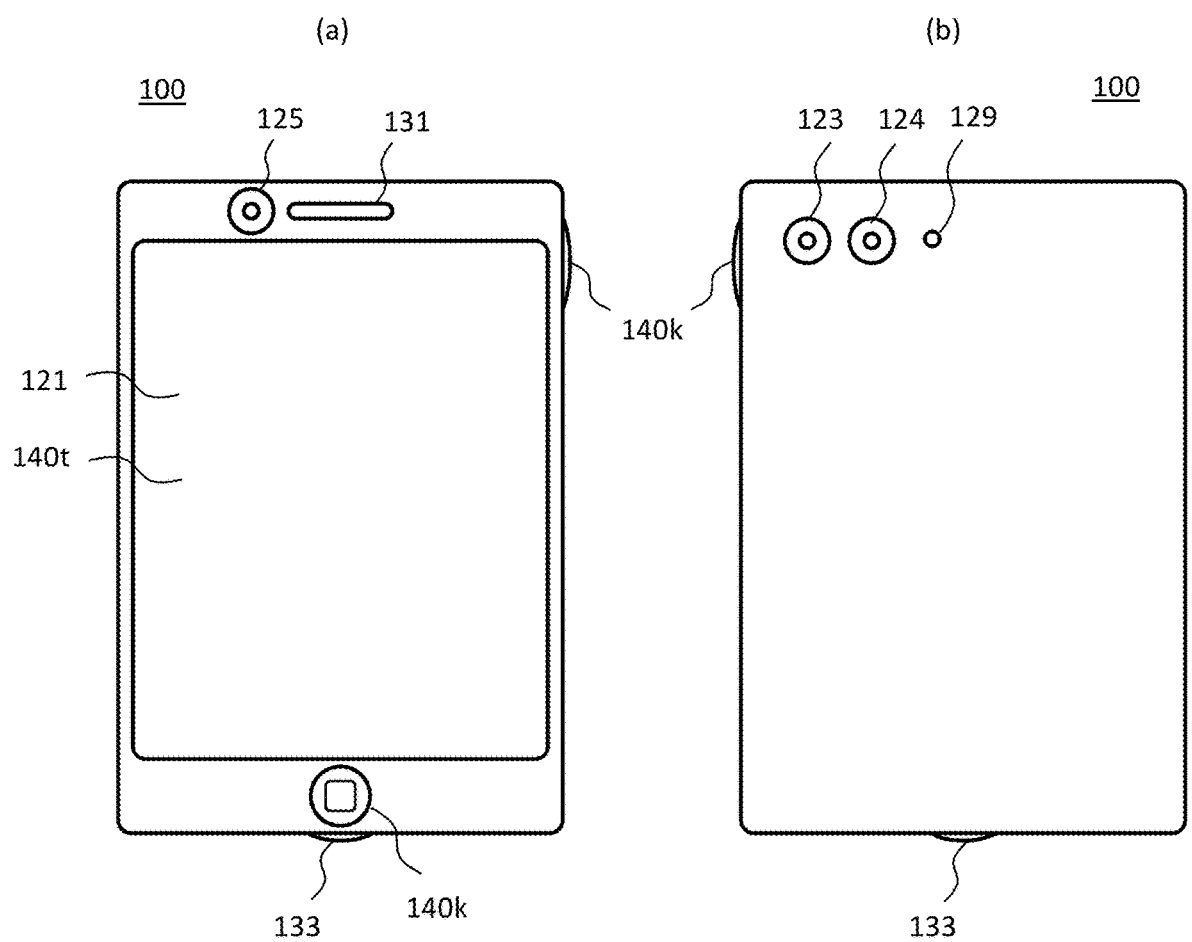
F I G. 1

FIG. 3

TITLE IMAGE CONTROL TABLE (T0)

| TYPE OF DISPLAY TITLE | PRIORITY FLAG | TITLE IMAGE GENERATION FLAG | TITLE IMAGE SYNTHESIS FLAG | CONDITIONS |
|---|---|---|---|---|
| YEAR | 1 | 1 | 0 | |
| SEASON | 2 | 1 | 0 | |
| MONTH | 3 | 1 | 1 | |
| DAY | 4 | 0 | x | |
| PLACE | 5 | 0 | x | DISTANCE ≥10km |

FIG. 4
(a) LIST DISPLAY OF CAPTURED IMAGES
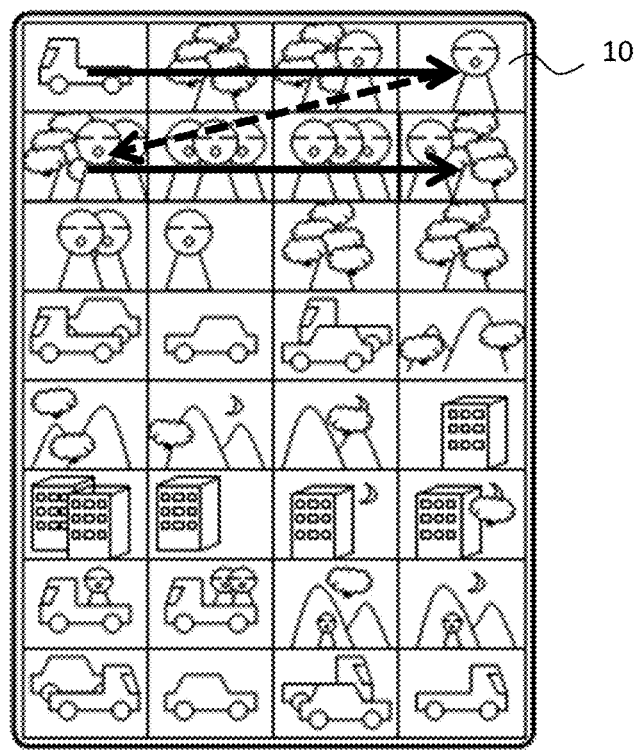
(b) GENERATION AND INSERTION OF TITLE IMAGE
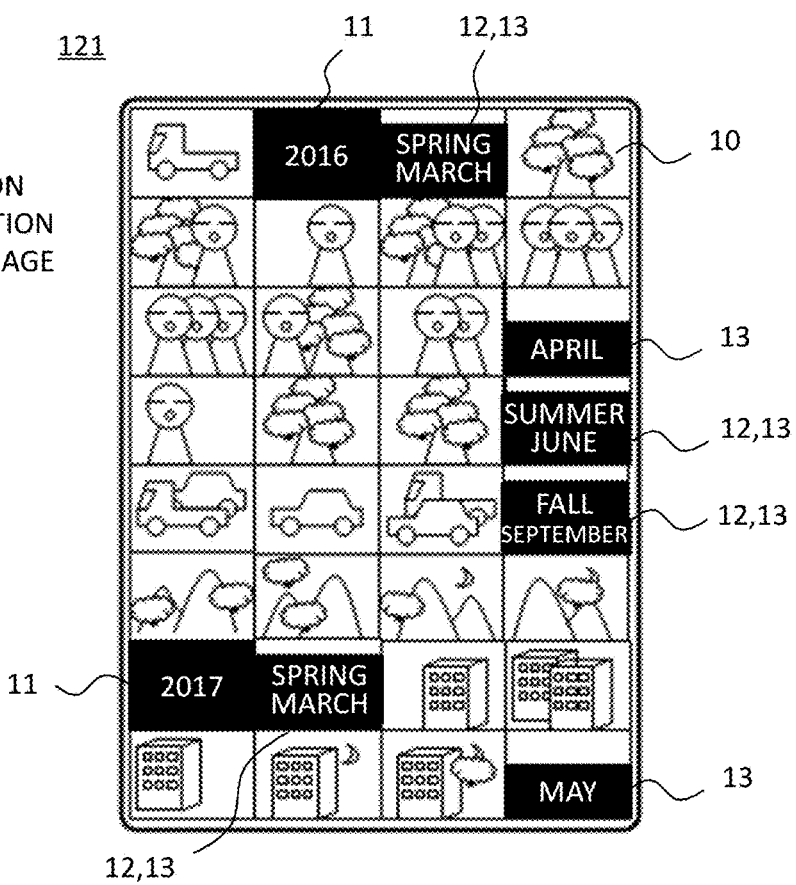

FIG. 7A

TITLE IMAGE CONTROL TABLE (T1)

| TYPE OF DISPLAY TITLE | PRIORITY FLAG | TITLE IMAGE GENERATION FLAG | TITLE IMAGE SYNTHESIS FLAG | CONDITIONS |
|---|---|---|---|---|
| YEAR | 1 | 1 | 0 | |
| SEASON | 2 | 1 | 0 | |
| MONTH | 3 | 1 | 0 | |

TITLE IMAGE CONTROL TABLE (T2=T0)

| TYPE OF DISPLAY TITLE | PRIORITY FLAG | TITLE IMAGE GENERATION FLAG | TITLE IMAGE SYNTHESIS FLAG | CONDITIONS |
|---|---|---|---|---|
| YEAR | 1 | 1 | 0 | |
| SEASON | 2 | 1 | 0 | |
| MONTH | 3 | 1 | 1 | |

TITLE IMAGE CONTROL TABLE (T3)

| TYPE OF DISPLAY TITLE | PRIORITY FLAG | TITLE IMAGE GENERATION FLAG | TITLE IMAGE SYNTHESIS FLAG | CONDITIONS |
|---|---|---|---|---|
| PLACE | 1 | 1 | 0 | DISTANCE ≥10km |
| YEAR | 2 | 1 | 0 | |

TITLE IMAGE CONTROL TABLE (T4)

| TYPE OF DISPLAY TITLE | PRIORITY FLAG | TITLE IMAGE GENERATION FLAG | TITLE IMAGE SYNTHESIS FLAG | CONDITIONS |
|---|---|---|---|---|
| PLACE | 1 | 1 | 0 | DISTANCE ≥10km |
| YEAR | 2 | 1 | 1 | |

FIG. 7B

| TITLE IMAGE CONTROL TABLE | STORED IMAGE OF STORAGE UNIT | | TEMPORARILY STORED IMAGE OF MEMORY UNIT | | | |
|---|---|---|---|---|---|---|
| (INITIAL STATE) | P1<br>2015.12.10<br>SPOT A | P2 (PREVIOUS)<br>2015.12.11<br>SPOT A | P3 (CURRENT)<br>2016.3.5<br>SPOT B | | | |
| (T1) | P1<br>2015.12.10<br>SPOT A | P2<br>2015.12.11<br>SPOT A | 21<br>2016<br>TITLE MAGE | 22<br>SPRING<br>TITLE MAGE | 23<br>MARCH<br>TITLE MAGE | P3<br>2016.3.5<br>SPOT B |
| (T2) | P1<br>2015.12.10<br>SPOT A | P2<br>2015.12.11<br>SPOT A | 21<br>2016<br>TITLE IMAGE | 22,23<br>SPRING MARCH<br>TITLE SYNTHESIS IMAGE | | P3<br>2016.3.5<br>SPOT B |
| (T3) | P1<br>2015.12.10<br>SPOT A | P2<br>2015.12.11<br>SPOT A | 24<br>SPOT B<br>TITLE IMAGE | 25<br>2016<br>TITLE IMAGE | | P3<br>2016.3.5<br>SPOT B |
| (T4) | P1<br>2015.12.10<br>SPOT A | P2<br>2015.12.11<br>SPOT A | 24,25<br>SPOT B 2016<br>TITLE SYNTHESIS IMAGE | | | P3<br>2016.3.5<br>SPOT B |

(NOTE) DISTANCE BETWEEN SPOT A AND SPOT B IS 100 km

FIG. 8A

TITLE IMAGE CONTROL TABLE (T5)

| TYPE OF DISPLAY TITLE | PRIORITY FLAG | TITLE IMAGE GENERATION FLAG | TITLE IMAGE SYNTHESIS FLAG | CONDITIONS |
|---|---|---|---|---|
| YEAR | 3 | 1 | 0 | |
| SEASON | | 0 | x | |
| MONTH | | 0 | x | |
| DAY | | 0 | x | |
| PLACE | | 0 | x | DISTANCE ≥10km |
| FAMILY | 1 | 1 | 1 | TABLE (T6) |
| PERSON | | 0 | x | |
| LANDSCAPE | 2 | 1 | 0 | |

FIG. 8B

FAMILY CONFIGURATION TABLE (T6)

| FAMILY MEMBER 1 | FACE IMAGE LINK OF FAMILY MEMBER 1 |
|---|---|
| FAMILY MEMBER 2 | FACE IMAGE LINK OF FAMILY MEMBER 2 |
| FAMILY MEMBER 3 | FACE IMAGE LINK OF FAMILY MEMBER 3 |
| FAMILY MEMBER 4 | FACE IMAGE LINK OF FAMILY MEMBER 4 |
| NUMBER OF MATCHED PERSONS | TWO OR MORE |

IMAGE ANALYSIS PROCESS (S404)

F I G. 1 1 A

TITLE IMAGE CONTROL TABLE (T7)

| TYPE OF DISPLAY TITLE | PRIORITY FLAG | TITLE IMAGE GENERATION FLAG | TITLE IMAGE SYNTHESIS FLAG | CONDITIONS |
|---|---|---|---|---|
| FAMILY | 1 | 1 | 0 | TABLE (T6) |
| PERSON | 2 | 1 | 0 | |
| YEAR | 3 | 1 | 0 | |

TITLE IMAGE CONTROL TABLE (T8)

| TYPE OF DISPLAY TITLE | PRIORITY FLAG | TITLE IMAGE GENERATION FLAG | TITLE IMAGE SYNTHESIS FLAG | CONDITIONS |
|---|---|---|---|---|
| FAMILY | 1 | 1 | 0 | TABLE (T6) |
| PERSON | 2 | 1 | 1 | |
| YEAR | 3 | 1 | 0 | |

TITLE IMAGE CONTROL TABLE (T9)

| TYPE OF DISPLAY TITLE | PRIORITY FLAG | TITLE IMAGE GENERATION FLAG | TITLE IMAGE SYNTHESIS FLAG | CONDITIONS |
|---|---|---|---|---|
| FAMILY | 1 | 0 | x | TABLE (T6) |
| PERSON | 2 | 1 | 0 | |
| YEAR | 3 | 0 | x | |

FIG. 11B

| TITLE IMAGE CONTROL TABLE | STORED IMAGE OF STORAGE UNIT | | TEMPORARILY STORED IMAGE OF MEMORY UNIT | | | |
|---|---|---|---|---|---|---|
| (INITIAL STATE) | P4 2015.12.10 PERSON | P5 (PREVIOUS) 2015.12.11 PERSON | P6 (CURRENT) 2016.3.5 FAMILY | | | |
| (T7) | P4 2015.12.10 PERSON | P5 2015.12.11 PERSON | 31 FAMILY TITLE IMAGE | 32 PERSON -END TITLE IMAGE | 33 2016 TITLE IMAGE | P6 2016.3.5 FAMILY |
| (T8) | P4 2015.12.10 PERSON | P5 2015.12.11 PERSON | 31,32 FAMILY PERSON -END TITLE SYNTHESIS IMAGE | 33 2016 TITLE IMAGE | | P6 2016.3.5 FAMILY |
| (T9) | P4 2015.12.10 PERSON | P5 2015.12.11 PERSON | 32 PERSON -END TITLE IMAGE | P6 2016.3.5 FAMILY | | |

FIG. 12
(a) LIST DISPLAY OF CAPTURED IMAGES
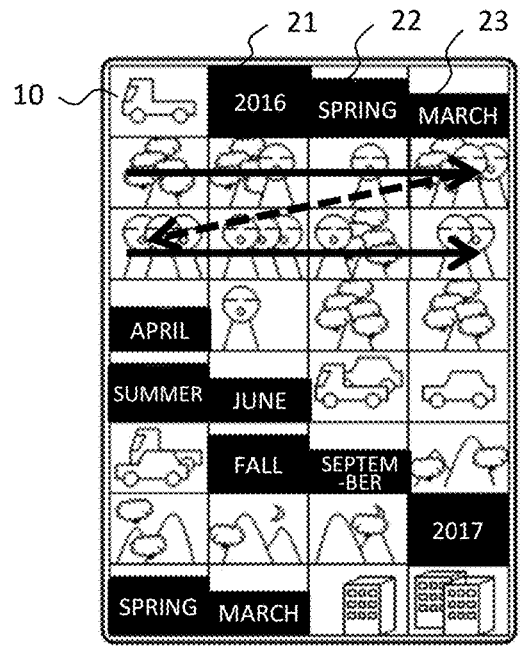
(b) SEARCH BY "2016"
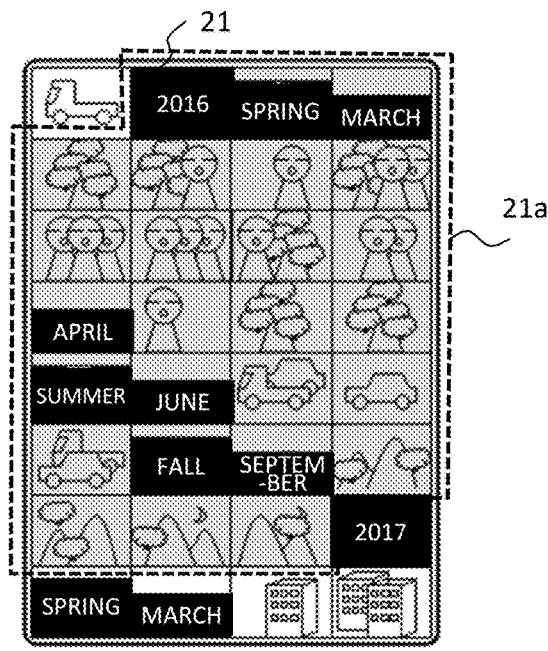
(c) SEARCH BY "SPRING"
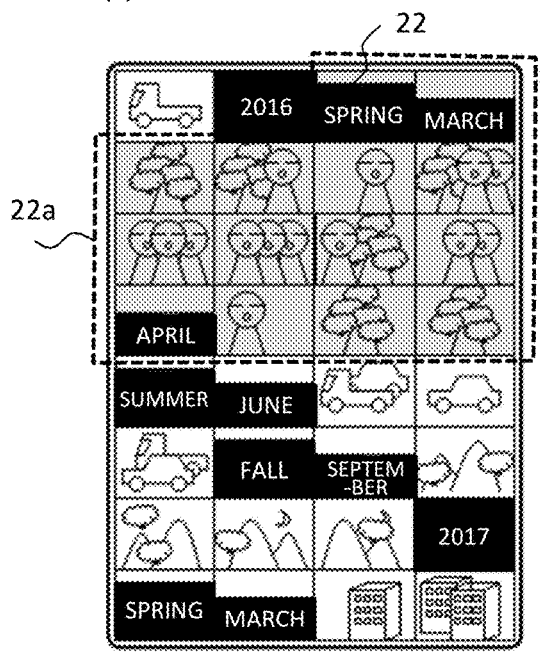
(d) SEARCH BY "MARCH"
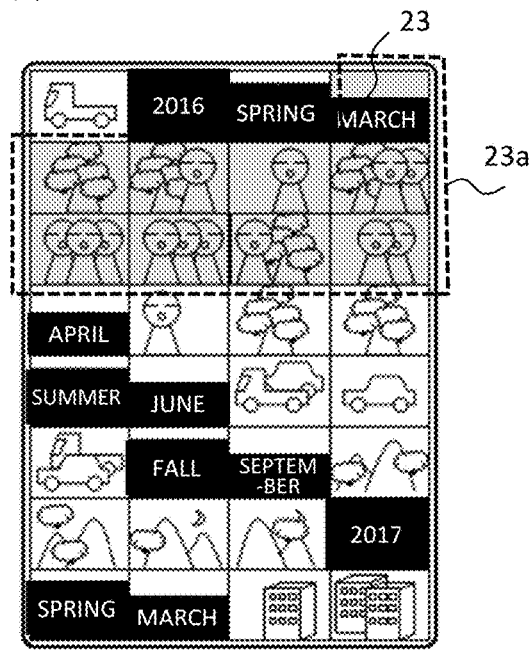

FIG. 13
(a) LIST DISPLAY OF CAPTURED IMAGES
TOP = "YEAR"
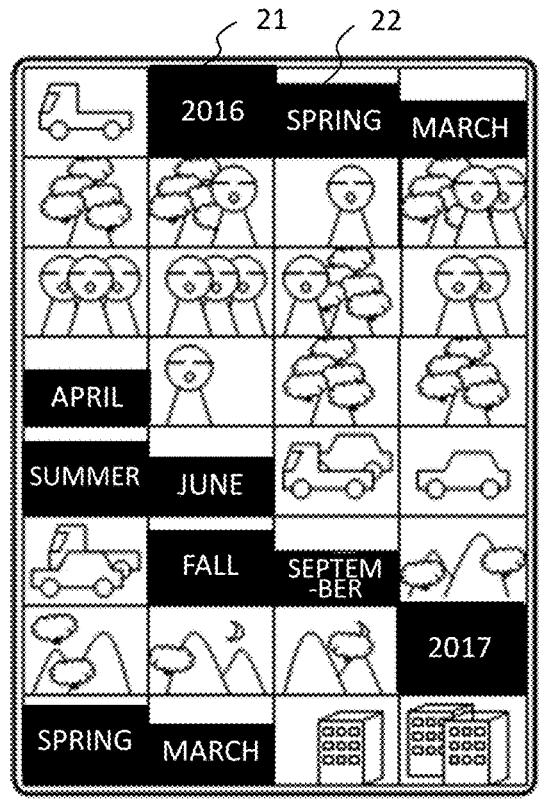
(b) CHANGE PRIORITY
TOP = "SEASON"
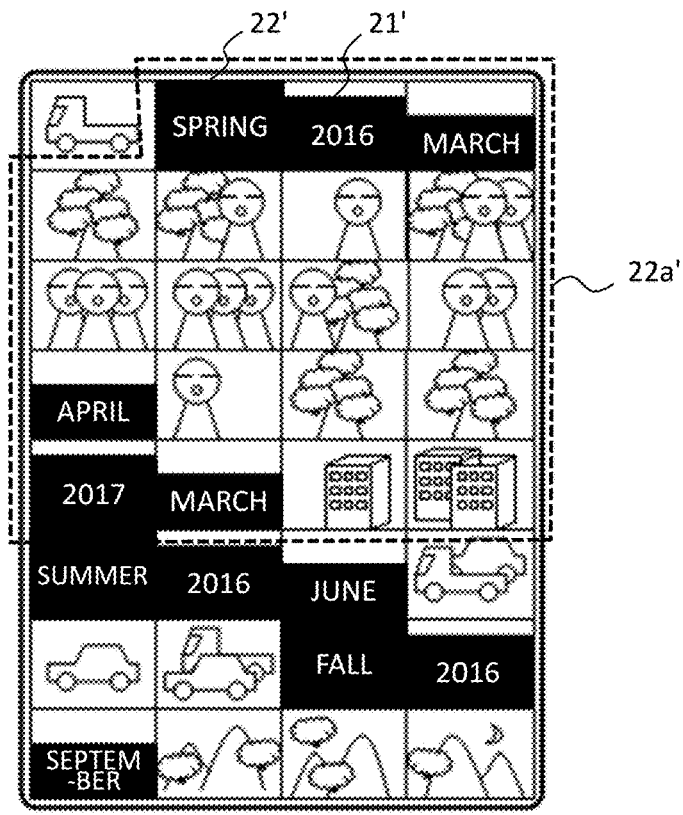

IMAGING APPARATUS WHICH GENERATES TITLE IMAGES FOR CLASSIFYING A PLURALITY OF CAPTURED IMAGES AND INSERTS THE TITLE IMAGES AS SEPARATE IMAGES WITHIN THE PLURALITY OF CAPTURED IMAGES

TECHNICAL FIELD

The present invention relates to an imaging apparatus capable of classifying, organizing and storing a plurality of images captured by a camera and easily searching for a desired image.

BACKGROUND ART

The spread of digital cameras that convert a subject image into an electrical signal using electronic devices such as a charge coupled device (CCD) and record it in a memory is remarkable. Further, recently, it has also become common for such a digital camera function to be installed in information terminal devices such as mobile phones, smartphones, and tablet terminals.

Further, as storage devices used in digital cameras or the like are increasing in capacity, and a large amount of captured image data is generated, classification and organization of image data are complicated. In particular, when a large number of images are displayed as a thumbnail list image, they can be classified using application software on the basis of metadata such as time and position information assigned to image data. However, a task of classifying a large number of image data into groups is necessary, and it is extremely time-consuming and inconvenient. In order to eliminate such defects, a technique of classifying and organizing a plurality of captured images by generating and inserting an image as a delimiter for a plurality of images has been proposed.

For example, a configuration in which, when a generation date of an image generated previously and a generation date of an image generated currently are different or when a photographing equipment used at the time of previous generation is different from a photographing equipment used at the time of current generation, a date image or the like is superimposed on an image captured by closing a shutter and inserted as a delimiter image is disclosed in Patent Document 1.

CITATION LIST

Patent Document

Patent Document 1: JP 2010-50705 A

SUMMARY OF THE INVENTION

Problems to be Solved by the Invention

In the technique described in Patent Document 1, the delimiter image is generated on the basis of a plurality of types of information such as generation date information, photographing equipment information, continuous shooting information, and voice input information. At that time, a priority is not set among a plurality of types of information serving as the generation conditions of the delimiter image, and they are treated equally. For example, in FIG. 5 of Patent Document 1, an image (a) on which the generation date information is superimposed, an image (b) on which the photographing equipment information is superimposed, and an image (c) on which the generation date information and the photographing equipment information are superimposed are illustrated, but the generation date information and the photographing equipment information in the image (c) are treated equally.

When there are a plurality of types of delimiter image generation conditions, it is desirable for users because a plurality of search conditions can be selected at the time of image search. However, if they are in an equal relation, when an attempt to perform search is made under a certain search condition 1, a delimiter image for another search condition 2 becomes awkward, and the usability deteriorates. Further, it is desirable for a group of images hitting a desired search condition to be displayed consecutively as one group.

It is an object of the present invention to provide an imaging apparatus which are capable of classifying captured images under a plurality of different conditions and easily searching for captured images under a desired condition.

Solutions to Problems

An imaging apparatus according to the present invention includes an imaging unit that images a subject, a title generation executing unit that generates title images each including a display title for classifying a plurality of captured images acquired by the imaging unit and inserts the title image into the captured images, a storage unit that stores the captured images and the title images, a display unit that displays the captured images and the title images stored in the storage unit in the form of a list, and an image search executing unit that searches for a desired captured image from the plurality of captured images and the title images displayed on the display unit in the form of the list, in which the title generation executing unit hierarchically generates the title images in accordance with a priority set in each type of display title for classifying the captured images.

Effects of the Invention

According to the present invention, since a plurality of captured images are automatically classified and organized hierarchically in accordance with a priority of a classification condition, it is possible to search for a desired image easily and quickly.

BRIEF DESCRIPTION OF THE DRAWINGS

FIG. 1 is an external view of an imaging apparatus according to a first embodiment.

FIG. 3 is a title image control table according to the first embodiment.

FIG. 4 is a diagram illustrating an example of a display screen of a title image.

FIG. 7A is another title image control table.

FIG. 7B is a diagram illustrating other generation examples of a title image.

FIG. 8A is a title image control table according to a second embodiment.

FIG. 8B is a family configuration table according to the second embodiment.

FIG. 11A is another title image control table.

FIG. 11B is a diagram illustrating other generation examples of a title image.

FIG. 12 is a diagram illustrating an example of a display screen at the time of image search according to a third embodiment.

FIG. 13 is a diagram illustrating an example of changing priority and rearranging captured images.

MODE FOR CARRYING OUT THE INVENTION

Figure 2A:
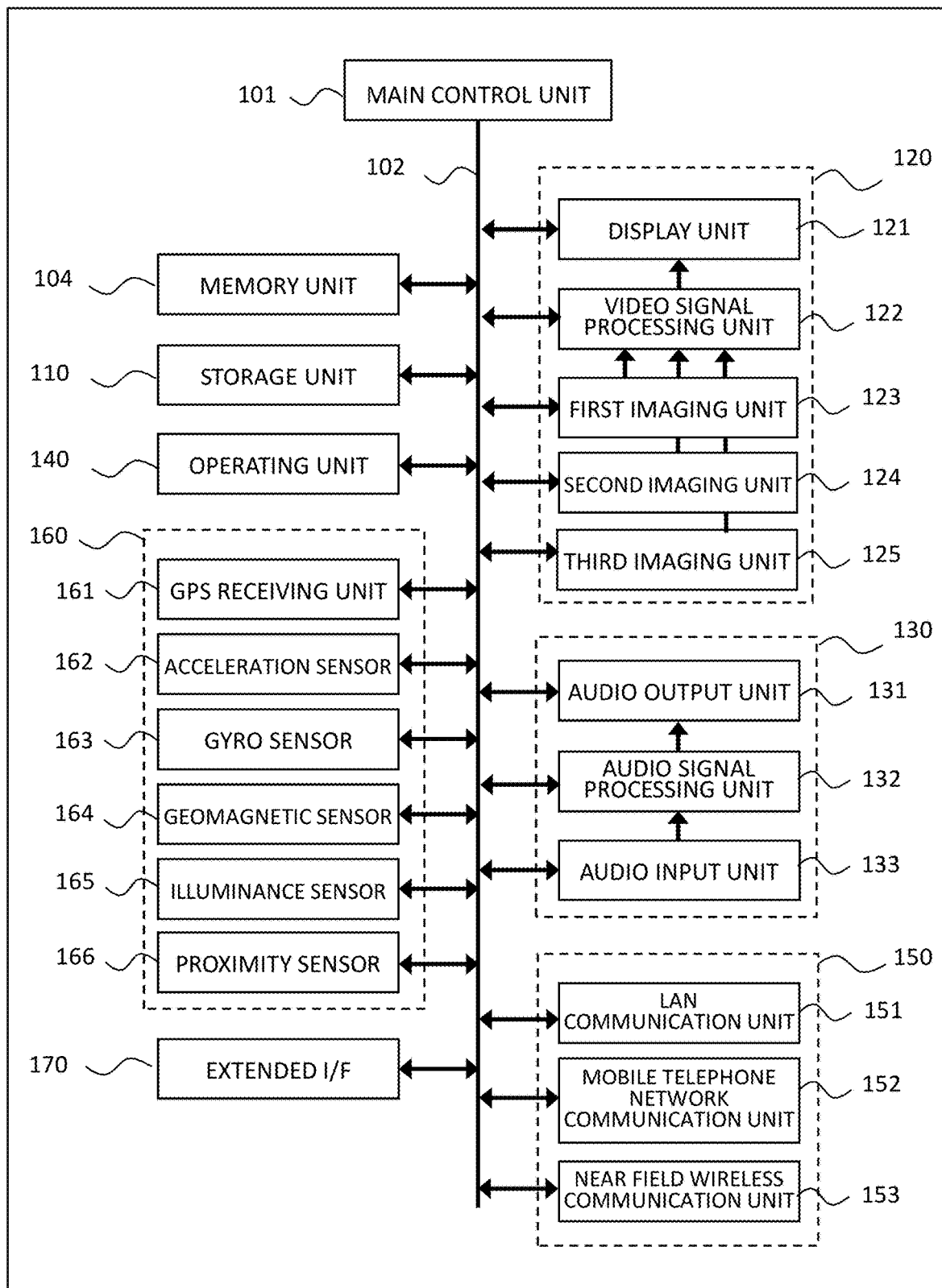
FIG. 2A is a block diagram of the imaging apparatus according to the first embodiment.

Hereinafter, examples of an embodiment of the present invention will be described with reference to the appended drawings. Note that embodiments to be described below are examples for realizing the present invention, and the present invention should be appropriately modified or changed depending on a configuration of an apparatus to which the present invention is applied or various conditions, and the present invention is not limited to the following embodiments.

First Embodiment

FIG. 1 illustrates an external appearance of an imaging apparatus of the present embodiment. Here, an imaging apparatus 100 is an example of an information terminal device such as a smart phone, (a) is a front view, (b) is a back view, and a display unit 121 that displays captured images or various information is arranged on the front side of (a). In the imaging apparatus 100 of the present embodiment, imaging units (cameras) are installed at three positions. As illustrated in (a), a third imaging unit 125 is arranged on the same surface (front surface) as the display unit 121, and as illustrated in (b), a first imaging unit 123 and a second imaging unit 124 are arranged on a side (back surface) opposite to the display unit 121. The third imaging unit 125 arranged on the same surface as the display unit 121 is also referred to as an in-camera, and the first imaging unit 123 and the second imaging unit 124 arranged on the side opposite to the display unit 121 are also referred to as out-cameras. A flash unit 129 is arranged at a position adjacent to the first imaging unit 123 and the second imaging unit 124.

Further, as input/output units of the imaging apparatus 100, an audio input unit (microphone) 133, an audio output unit (speaker) 131, an operation key 140k, and a touch panel 140t are arranged.

Incidentally, the imaging apparatus 100 may be a smart phone, a digital still camera, a mobile phone equipped with a camera function, a tablet terminal, a personal digital assistants (PDA), or a notebook personal computer (PC). Further, the imaging apparatus 100 may also be a video camera capable of capturing a moving image, a portable game console, or other portable digital devices. Therefore, A configuration of the imaging unit (camera) is not limited to the above example, and depending on a function of the information terminal device, the first imaging unit 123 and the second imaging unit 124 may be integrated, or the first to third imaging units may be integrated, and a single camera may be arranged on the back side or the display unit 121 side.

FIG. 2A is a block diagram of the imaging apparatus of the present embodiment. The imaging apparatus 100 includes a main control unit 101, a system bus 102, a memory unit 104, a storage unit 110, a video processing unit 120, an audio processing unit 130, an operating unit 140, a communication processing unit 150, a sensor unit 160, and an extended interface unit 170.

The main control unit 101 is a microprocessor unit that controls the imaging apparatus 100 in general in accordance with a predetermined program. The system bus 102 is a data communication path for performing transmission and reception of data between the main control unit 101 and the respective units in the imaging apparatus 100.

The memory unit 104 serves as a program region when a basic operation program or other application programs are executed or a temporary storage region that temporarily holds image data or the like if necessary when various application programs are executed. The memory unit 104 may be integrated with the main control unit 101.

The storage unit 110 stores various types of setting information of the imaging apparatus 100 or still image data, moving image data, and the like taken by the imaging apparatus 100. Also, the storage unit 110 stores various types of application programs executed by the imaging apparatus 100. The main control unit 101 expands an application program stored in the storage unit 110 onto the memory unit 104, and executes the expanded application program, so that the imaging apparatus 100 realizes various types of functions. The application program can be downloaded from an application server via the Internet and expanded.

It is necessary for the storage unit 110 to hold stored information even in a state in which the imaging apparatus 100 is not supplied with electric power. Therefore, for example, devices such as a flash ROM, a solid-state drive (SSD), and a hard disc drive (HDD) are used.

The video processing unit 120 includes the display unit 121, the video signal processing unit 122, the first imaging unit 123, the second imaging unit 124, and the third imaging unit 125. The display unit 121 is a display device such as, for example, a liquid crystal panel, and provides the image data processed by the video signal processing unit 122 to the user of the imaging apparatus 100. The video signal processing unit 122 processes the image data captured by the first imaging unit 123, the second imaging unit 124, and the third imaging unit 125.

The audio processing unit 130 includes an audio output unit 131, an audio signal processing unit 132, and an audio input unit 133. The audio output unit 131 is a speaker, and provides an audio signal processed by the audio signal processing unit 132 to the user of the imaging apparatus 100. The audio input unit 133 is a microphone and converts a voice of the user or the like into audio data and inputs it. Incidentally, the audio input unit 133 may be separate from the imaging apparatus 100 and may be connected to the imaging apparatus 100 via wired communication or wireless communication.

The operating unit 140 is an instruction input unit that inputs an operation instruction to the imaging apparatus 100, and as illustrated in FIG. 1, the touch panel 140t arranged on the display unit 121 in a superimposed manner and the operation key 140k in which button switches are arranged correspond to the operating unit 140. Incidentally, the touch panel function may be installed in the display unit 121. As another operation technique, an operation on the imaging apparatus 100 may be performed using a keyboard or the like connected to the extended interface unit 170 to be described later. Alternatively, an operation on the imaging apparatus 100 may be performed using a separate information terminal device connected via wire communication or wireless communication.

The communication processing unit 150 includes a Local Area Network (LAN) communication unit 151, a mobile telephone network communication unit 152, and a near field wireless communication unit 153. The LAN communication unit 151 is connected to a wireless communication access point on the Internet via wireless communication and performs transmission and reception of data. The mobile telephone network communication unit 152 performs telephone communication (call) and transmission/reception of data via wireless communication with a base station of a mobile telephone communication network. The near field wireless communication unit 153 performs wireless communication in close proximity to a corresponding reader/writer. Each of the LAN communication unit 151, the mobile telephone network communication unit 152, and the near field wireless communication unit 153 includes an encoding circuit, a decoding circuit, an antenna, and the like. Further, an infrared communication unit may be installed.

The sensor unit 160 is a group of sensors for detecting the state of the imaging apparatus 100, and in the present embodiment, the sensor unit 160 includes a global positioning system (GPS) receiving unit 161, an acceleration sensor 162, a gyro sensor 163, a geomagnetic sensor 164, an illuminance sensor 165, and a proximity sensor 166. A position, a motion, an inclination, a direction, and ambient brightness of the imaging apparatus 100, the proximity of surrounding objects, and the like are detected by such a group of sensors.

The extended interface unit 170 is an interface group for extending the function of the imaging apparatus 100, and in the present embodiment, the extended interface unit 170 includes a video/audio interface, a universal serial bus (USB) interface, a memory interface, or the like. For example, the video/audio interface receives a video signal/audio signal from an external video/audio output device and outputs a video signal/audio signal to an external video/audio input device. The USB interface establishes a connection with keyboards or other USB devices. The memory interface establishes a connection with a memory card or other memory mediums and performs transmission and reception of data.

Incidentally, the configuration of the imaging apparatus 100 illustrated in FIG. 2A is an example of an information terminal device such as a smartphone, and it will be appreciated that the configuration can be changed appropriately depending on a function of a target information terminal device.

Figure 2B:
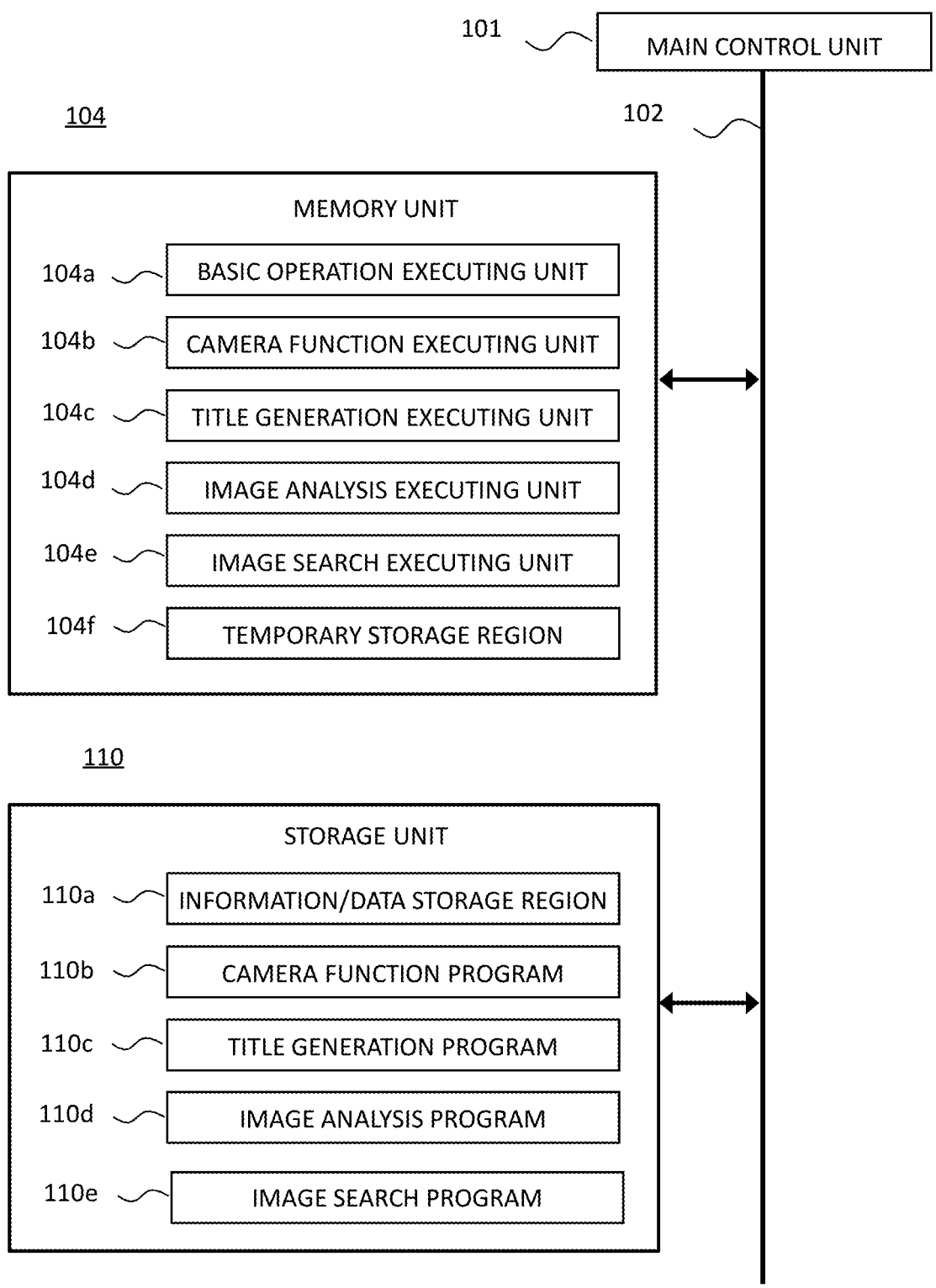
FIG. 2B is a software configuration diagram of the imaging apparatus according to the first embodiment.

FIG. 2B is a software configuration diagram of the imaging apparatus of the present embodiment and illustrates a software configuration of the memory unit 104 and the storage unit 110.

The storage unit 110 includes an information/data storage region 110a, and also stores a camera function program 110b, a title generation program 110c, an image analysis program 110d, and an image search program 110e. The information/data storage region 110a stores various types of setting information of the imaging apparatus 100, or still image data, moving image data, or the like captured by the imaging apparatus 100. Also, the camera function program 110b is a program for executing photographing, the title generation program 110c is a program for generating a title image, the image analysis program 110d is a program for analyzing a captured image, and the image search program 110e is a program for searching for the captured images.

The memory unit 104 includes a basic operation executing unit 104a that performs a basic operation of an information terminal device, various types of executing units 104b to 104e that perform operations related to an imaging function, and a temporary storage region 104f that temporarily stores captured images or the like. The programs 110b to 110e stored in the storage unit 110 are expanded onto the memory unit 104. Then, the main control unit 101 constitutes a camera function executing unit 104b, a title generation executing unit 104c, an image analysis executing unit 104d, and an image search executing unit 104e and execute various types of functional operations by executing the respective programs.

In the present embodiment, various types of functional operations of the imaging apparatus are realized by software, but a configuration in which various types of executing units 104b to 104e described above are realized by hardware is also possible.

Next, an operation of the imaging apparatus of the present embodiment, particularly the generation of the title image will be described in detail. In the present embodiment, the delimiter image for classifying a plurality of captured images is referred to as a "title image." A title image including a keyword (display title) for classification is generated. At that time, a feature lies in that a priority is set in accordance with a type of display title, and the title image is hierarchically generated in accordance with the priority.

FIG. 3 illustrates a title image control table that defines title image generation rules. A title image control table (T0) is set by the user in advance and stored in the information/data storage region 110a of the storage unit 110. Here, "year," "season," "month," "day," and "place" are registered as the type of display title of the title image. The title generation executing unit 104c generates a title image having a display title when "year," "season," or the like is different among photographing conditions. Incidentally, the type of display title is not limited thereto, and any type can be added as long as it can be distinguished on the basis of time information and position information (GPS information). "Season" is defined as spring (March to May), summer (June to August), autumn (September to November), and winter (December to February), but the period can be arbitrarily set. Further, "place" is not a simply different place and is defined as a different place if a previous photographing position and a current photographing position are away from each other by a predetermined distance or more. In this example, as written in a condition field, it is defined as a different place if a distance is 10 km or more.

In the title image control table, a priority flag (=1, 2, . . . ) is set in accordance with the type of display title. Here, the display title is given a priority in the order of "year," "season," "month," and the like. A title image generation flag indicates a case in which the title image is generated (flag=1) and a case in which the title image is not generated (flag=0), and in this example, when the display title is "day" and "place," the title image is assumed not to be generated.

Further, a title image synthesis flag indicates a case in which it is synthesized with other types of title images generated previously (flag=1) and a case in which it is not synthesized with other types of title images generated previously (flag=0). In this example, in the case of "year" and "season," it is not synthesized with other types of title images, and in the case of "month," it is synthesized with other types of title images. However, even when its own title image synthesis flag=0, it may be synthesized with other types of title images generated later when the title image synthesis flag of other types of title images generated later is 1. Further, the title image synthesis flag=X mark indicates a not care (irrelevant).

Further, in the present embodiment, a design of the title image to be generated is changed in accordance with the priority of the display title. Specifically, as will be described later, the visibility of the title image is changed by changing at least one of a size (aspect ratio) of the title image, a character size in an image, a background color of an image, and a resolution of an image. In other words, when the title image is displayed hierarchically in accordance with the priority, the user can easily identify the title image with the high priority and quickly search for the captured image belonging to the display title with the high priority.

FIG. 4 is a diagram illustrating an example of a display screen of the title image. A series of images 10 captured by the imaging apparatus 100 are displayed on the display unit 121 in the form of thumbnails. (a) illustrates a state in which the captured images 10 are arranged chronologically without title image, and the photographing order is an arrow direction, that is, from left to right of the screen and also from top to bottom. (b) illustrates a state in which title images 11 to 13 are generated and inserted into the captured images 10 and displayed in the form of a list.

The title image generation rule follows the title image control table (T0) of FIG. 3, and each time "year," "season," and "month" among the photographing conditions are changed, the title image indicating content of the display title (a white character in a black screen in this example) is generated and inserted into a position of the delimiter of the captured image. The title image 11 is inserted as a delimiter of "year," highest in priority, and largest in an image size. The title image 12 is inserted as a delimiter of "season," and the title image 13 is inserted as a delimiter of "month," and the image size decreases in accordance with the priority. Further, when "season" and "month" are changed simultaneously, the title image 12 and the title image 13 are combined and displayed.

As described above, since the title image is displayed hierarchically while changing the image size in accordance with the priority, the user can quickly search for the captured image belonging to the display title "year" with the high priority.

Figure 5:
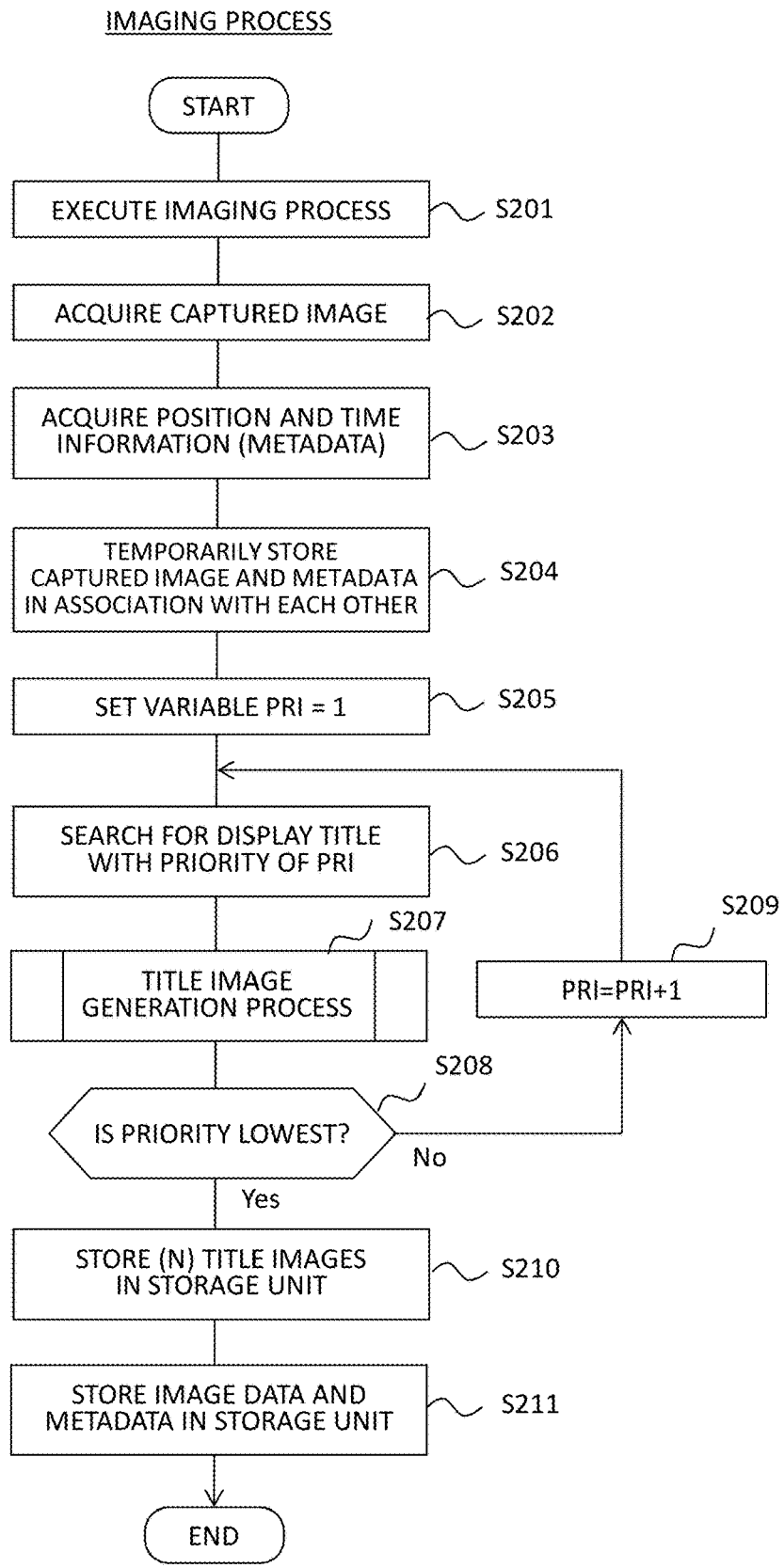
FIG. 5 is a flowchart illustrating an imaging operation according to the first embodiment.

FIG. 5 is a flowchart illustrating an imaging operation of the imaging apparatus 100. The imaging operation is controlled by a camera function executing unit 104b and a title generation executing unit 104c configured in the memory unit 104.

When an imaging instruction is issued from the operating unit 140 to any of the first imaging unit 123, the second imaging unit 124, and the third imaging unit 125, an imaging process is executed (S201). A captured image is acquired from the imaging unit (for example, the first imaging unit 123) instructed accordingly (S202). Then, the time information and the position information at the time of photographing are acquired from an internal timepiece mechanism (not illustrated) and the GPS receiving unit 161 and used as metadata of the captured image (S203). The acquired captured image and the metadata are associated with each other and temporarily stored in the temporary storage region 104f of the memory unit 104 (S204).

Then, a variable PRI for internal processing is initialized to 1 (S205). The variable PRI is a parameter of the priority of the title image. The display title with the priority set in the variable PRI is searched for with reference to the title image control table stored in the storage unit 110 (S206). For example, in the case of the title image control table (T0) of FIG. 3, the display title "year" is searched for the variable PRI=1. Then, a title image generation process is executed on the searched display title (for example, "year") in accordance with the settings of the title image control table (S207). Although specific content of the title image generation process will be described later, the title image is generated when the title image generation flag of the target display title is 1 (the title image should be generated), and the photographing conditions do not match the previously captured image. The generated title image is temporarily stored in the temporary storage region 104f in the memory unit 104. After the title image generation process ends, it is determined whether or not the priority of the processed display title is lowest (S208).

If it is determined in S208 that the priority of the processed display title is not lowest, 1 is added to the variable PRI (S209), and the process returns to S206. Then, a similar process is performed on the display title of the next priority. In the case of the control table (T0) in FIG. 3, the title image generation process is performed on the display title "season" having a priority of the variable PRI=2.

When it is determined in S208 that the priority of the processed display title is lowest, the title image generation process ends. Then, the temporarily stored title image is stored in the information/data storage region 110a of the storage unit 110 (S210). Incidentally, the number (N) of title images generated in S207 is in the range from 0 to the maximum setting number of set priorities. Then, the image data and the metadata temporarily stored in the temporary storage region 104f of the memory unit 104 are stored in the information/data storage region 110a of the storage unit 110 (S211). Thereafter, the imaging process ends.

Figure 6A:
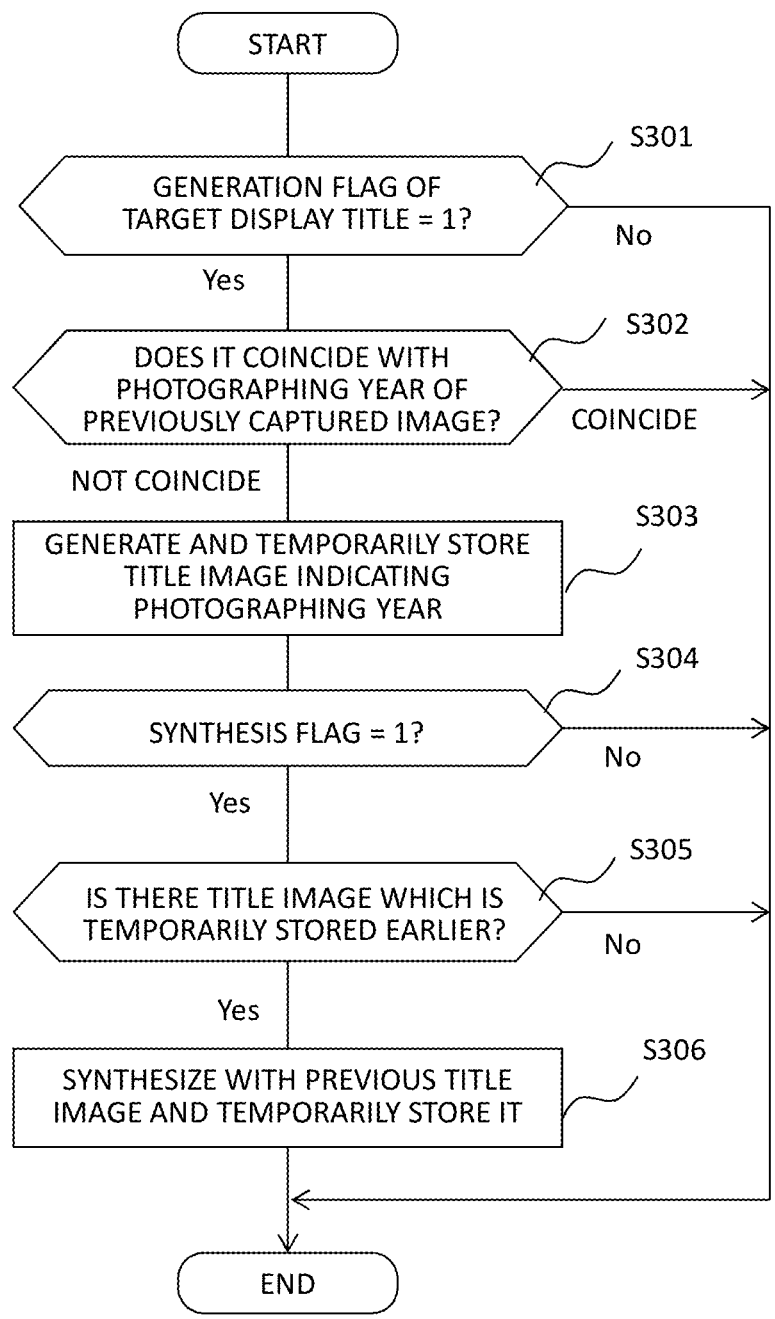
FIG. 6A is a flowchart illustrating a title image generation process.
Figure 6B:
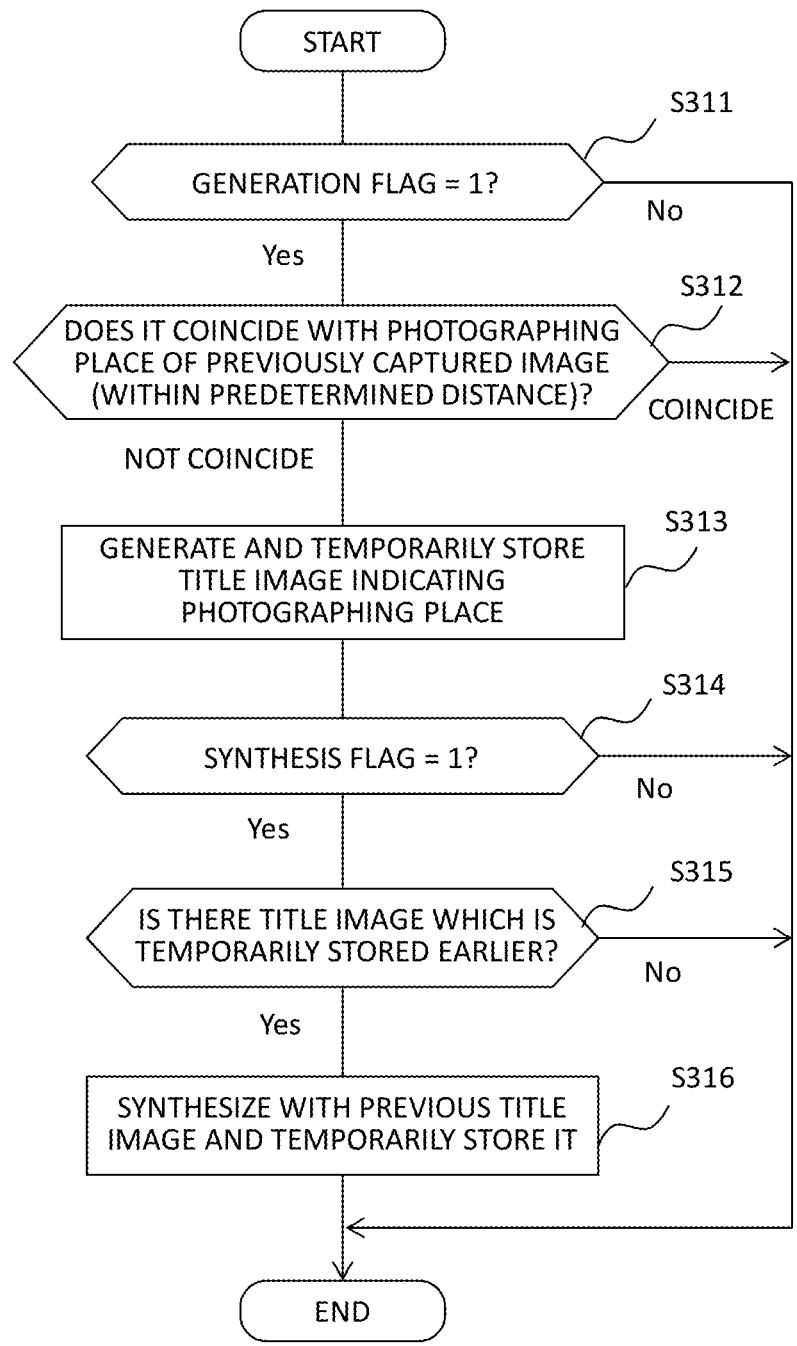
FIG. 6B is a flowchart illustrating a title image generation process.

FIGS. 6A and 6B are flowcharts illustrating the title image generation process (S207) of FIG. 5 in detail. In the title image generation process (S207), the title image is generated for each display title, but here, the description will proceed with an example in which the display title is "year" and "place." The same applies to the other display titles "season," "month," and "day," and description thereof is omitted.

FIG. 6A is a flowchart illustrating the title image generation process for "year." The process is executed subsequently to S206 of FIG. 5. It is determined whether or not the title image generation flag is set to 1 with reference to the title image control table (S301). When the generation flag is not set to 1, the present process ends.

When the generation flag is set to 1, the photographing year is read from the metadata of the previously captured image among the images stored in the storage unit 110, and it is determined whether or not it coincides with the photographing year of the currently captured image temporarily stored in the memory unit 104 (S302). When the photographing years coincide in S302, the present process ends.

If the photographing years do not coincide in S302, a title image of a design corresponding to the priority of the display title is generated. In other words, the title image having the image size (aspect ratio) decided in advance in accordance with the priority and including characters indicating the photographing year (the Christian year, Japanese year, or the like) is generated and temporarily stored in the temporary storage region 104f of the memory unit 104 (S303). Incidentally, as the background image of the title image, an image, a calendar, or the like indicating the zodiac of the year may be used. Further, when the display title is "season," an image with a sense of season, for example, an image of cherry blossoms, sea, autumn leaves, snow scenery, or the like may be used as the background image.

Then, it is determined whether or not the title image synthesis flag of the title image control table is set to 1 (S304). When the synthesis flag is not set to 1, the present process ends. In other words, it is not synthesized with other title images generated earlier, but it becomes a single title image.

When the synthesis flag is set to 1, it is determined whether or not there is a title image with a higher priority which is generated earlier and temporarily stored in the memory unit 104 (S305). If there is no title image which is previously temporarily stored, the present process ends.

When there is a title image which is previously temporarily stored, the previously generated title image and the currently generated title image are synthesized and temporarily stored in the memory unit 104 (S306). Incidentally, at this time, in the synthesis process, the currently generated title image is reduced or modified so that a hierarchical difference from the previously generated title image with a higher priority becomes clear. For example, a design in which the currently generated title image is arranged in the lower part of the screen, and the character size of the display title is reduced is employed. Thereafter, the title image generation process ends, and the process shifts to S208 of FIG. 5.

FIG. 6B is a flowchart illustrating the title image generation process for "place."

It is determined whether or not the title image generation flag is set to 1 with reference to the title image control table (S311). When the generation flag is not set to 1, the present process ends.

When the generation flag is set to 1, the photography place from the metadata of the previously captured image stored in the storage unit 110, and it is determined whether or not it coincides with the photographing place of the currently captured image temporarily stored in the memory unit 104 (S312). In this determination, it is assumed to coincide with the photographing place of the currently captured image when a distance between the two photographing places is less than a distance described in the condition field of the title image control table (10 km in FIG. 3). Further, when the captured image is a moving image obtained by moving the imaging apparatus, it is desirable to appropriately decide a position to be compared as the photographing place such as a photographing start position or a photographing end position. When the photographing places coincide in S312, the present process ends.

When the photographing places do not coincide in S312, a title image of a design corresponding to the priority of the display title is generated. In other words, the title image having the image size (aspect ratio) decided in advance in accordance with the priority and including characters (for example, Hakone, sunlight, or the like) indicating the photographing place is generated and temporarily stored in the temporary storage region 104f of the memory unit 104 (S313). Incidentally, as the background image of the title image, a map image of the place or a landmark image representing the place may be used. These characters or images can be obtained from a providing server via the Internet through the communication processing unit 150.

Then, it is determined whether or not the title image synthesis flag of the title image control table is set to 1 (S314). When the synthesis flag is not set to 1, the present process ends.

When the synthesis flag is set to 1, it is determined whether or not there is a title image with a higher priority which is generated earlier and temporarily stored in the memory unit 104 (S315). If there is no title image which is previously temporarily stored, the present process ends.

When there is a title image which is previously temporarily stored, the previously generated title image and the currently generated title image are synthesized and temporarily stored in the memory unit 104 (S316). At this time, the synthesis process is similar to the description of S306 of FIG. 6A. Alternatively, when the currently generated title image is an image such as a map or a landmark, the characters of the previously generated title image may be superimposed on the map or the landmark as a background. Thereafter, the title image generation process ends, and the process shifts to S208 of FIG. 5.

FIG. 7A and FIG. 7B are diagrams illustrating other generation example of the title image. FIG. 7A illustrates examples of (T1) to (T4) as other examples of the title image control table. Here, fields in which the title image generation flag=0 are omitted. The control table (T2) has the same content as the control table (T0) of FIG. 3. FIG. 7B illustrates an example of the title image generated in accordance with the control tables.

As an (initial state) of FIG. 7B, a state in which, when two captured images P1 and P2 are stored in the storage unit 110 together with metadata, an imaging process is newly executed, and a captured image P3 and metadata are temporarily stored in the temporary storage region 104f of the memory unit 104 is assumed. In this case, the image P2 is a previous image, and the image P3 is a current image. Information of a photographing date and time and a photographing place which are metadata is written below each image. A method of generating the title image in accordance with each title image control table of FIG. 7A at this time will be described.

In the case of the control table (T1), a priority is given in the order of "year," "season," and "month," the title image generation flag is 1, and the title image synthesis flag is 0. In this case, since the photographing date and time of the previously captured image P2 and the photographing date and time of the currently captured image P3 do not match in "year," "season," and "month," a title image 21 of year, a title image 22 of season, and a title image 23 of moth are generated in the described order. At this time, the size of the title image is changed in accordance with the priority. Further, the font size may be changed. Since the synthesis flag is 0 in all, the synthesis of the title image is not performed. The three generated title images are inserted immediately before the captured image P3.

In the case of the control table (T2), since the title image synthesis flag of "month" is set to 1 in the control table (T1), the title images 22 and 23 of season and month are synthesized.

In the case of the control table (T3), the priority is given in the order of "place" and "year," the title image generation flag is 1, and the title image synthesis flag is 0. In this case, the distance between a spot A which is the previous photographing place and a spot B which is the current photographing place is 100 km, and the two spots are away from each other by 10 km or more as described in the control table. Also, since the photographing years are different, a title image 24 of place and a title image 25 of year are generated.

In the case of the control table (T4), since the title image synthesis flag of "year" is set to 1 in the control table (T3), the title images 24 and 25 of place and year are synthesized.

As described above, since a desired title image control table is set, it is possible to generate a title image having a hierarchical structure in accordance with the priority and insert it as a delimiter image. As a result, a plurality of captured images can be classified and organized in accordance with a desired priority.

Second Embodiment

In the first embodiment, the title image is generated on the basis of the time information and the position information (GPS information) that are the metadata of the captured image. In the second embodiment, further, a type of subject in the captured image is identified, and the title image is generated on the basis of the type of subject. Therefore, the image analysis executing unit 104*d* illustrated in FIG. 2B is used as the configuration of the imaging apparatus 100, and for example, it is determined whether or not there is a person or the like in the image, and metadata is added. In the following description, metadata used in the first embodiment is referred to as "metadata 1," and metadata added in the second embodiment is referred to as "metadata 2" so that they can be distinguished from each other.

FIG. 8A is a title image control table for generating a title image in the present embodiment. In a title image control table (T5), "family," "person", and "landscape" which are types of subject are added as the type of display title. Here, "family" is an image in which a person is shown, and a family member is included in the person. "Person" is an image of a person other than a family. "Landscape" is an image in which no person is shown.

FIG. 8B is a family configuration table which defines conditions for determining a "family" image. The family configuration table (T6) includes a face image link of a family and the number of matched persons. It is determined whether or not the captured image matches a face image of a face image link destination of the family, and when the number of matched persons is a predetermined number (here, two or more), it is determined to be the image of the family.

Incidentally, the image analysis executing unit 104*d* performs person recognition and family recognition (by face recognition) by image analysis, but it is desirable to use known techniques (for example, a Viola-Jones technique or the like) using pattern recognition, machine learning, or the like, and a realization method thereof is not particularly limited. Further, although a family, a person, and a landscape are dealt as the display titles to be added here, a mountain, an animal, a friend, alumni, or the like may be used if image analysis results are used, and there is no particular limitation.

A priority is set in each display title, similarly to the first embodiment, and the hierarchical structure of the title image is realized by generating a title image having a different design in accordance with the priority. The title image control table (T5) and the family configuration table (T6) are set by the user in advance and stored in the storage unit 110.

Figure 9:
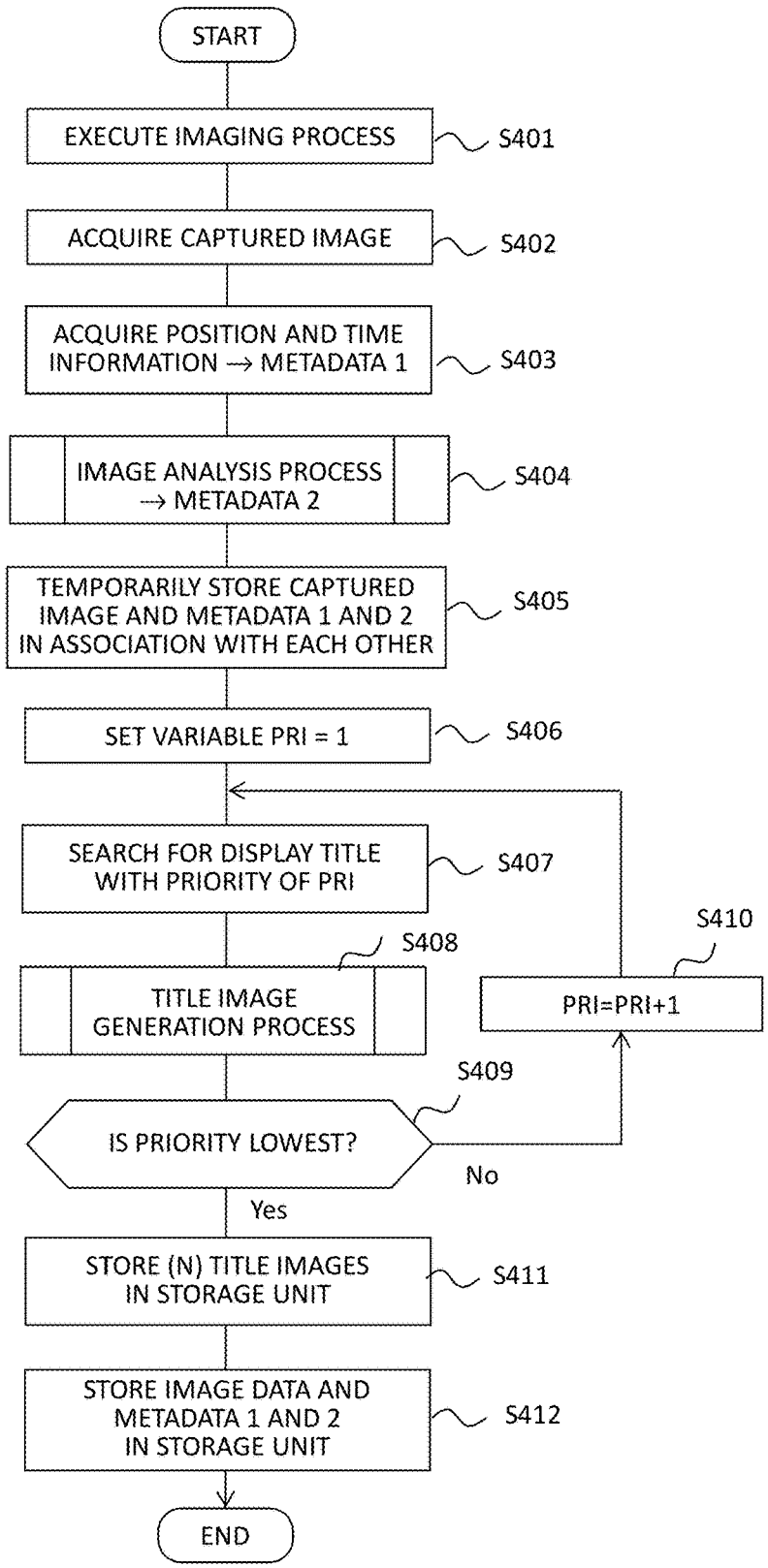
FIG. 9 is a flowchart illustrating an imaging operation according to the second embodiment.

FIG. 9 is a flowchart illustrating an imaging operation of the imaging apparatus 100. S401 to S403 are processes of acquiring the captured images and the metadata and are identical to S201 to S203 of the first embodiment, and thus description thereof is omitted. Further, the metadata 1 is assumed to be acquired in S403.

The captured image is analyzed by the image analysis executing unit 104*d* to determine whether the image is a family image, a person image, or a landscape image, and a determination result is generated as the metadata 2 (S404). The details of the image analysis process will be described later. The captured image is associated with the metadata 1 and 2 and temporarily stored in the temporary storage region 104*f* of the memory unit 104 (S405).

Then, a variable PRI for internal processing is initialized to 1 (S406). The display title with the priority set in the variable PRI is searched for with reference to the title image control table stored in the storage unit 110 (S407). For example, in the case of the title image control table (T5) of FIG. 8A, the display title "family" is searched for the variable PRI=1. Then, the title image generation process is executed on the searched display title in accordance with the settings of the title image control table (S408).

Although specific content of the title image generation process will be described later, the addition to the generation of the title image when it is changed to the target display title of the currently captured image, the title image indicating that the target display title has "ended" is generated when it is changed to the target display title of the previously captured image, that is, the display title other than the target display title of the currently captured image. The generated title image is temporarily stored in the temporary storage region 104*f* in the memory unit 104. After the title image generation process ends, it is determined whether or not the priority of the processed display title is lowest (S409).

If it is determined in S409 that the priority of the processed display title is not lowest, 1 is added to the variable PRI (S410), and the process branches to S407. Then, the same process is performed on the display title of the next priority. In the case of the control table (T5) in FIG. 8A, the title image generation process is performed on the display title "landscape" having a priority of the variable PRI=2.

When it is determined in S409 that the priority of the processed display title is lowest, the title image generation process ends. Then, the temporarily stored title image is stored in the information/data storage region 110*a* of the storage unit 110 (S411). Then, the image data and the metadata 1 and 2 temporarily stored in the temporary storage region 104*f* of the memory unit 104 are stored in the information/data storage region 110*a* of the storage unit 110 (S412). Thereafter, the imaging process ends.

Figure 10A:
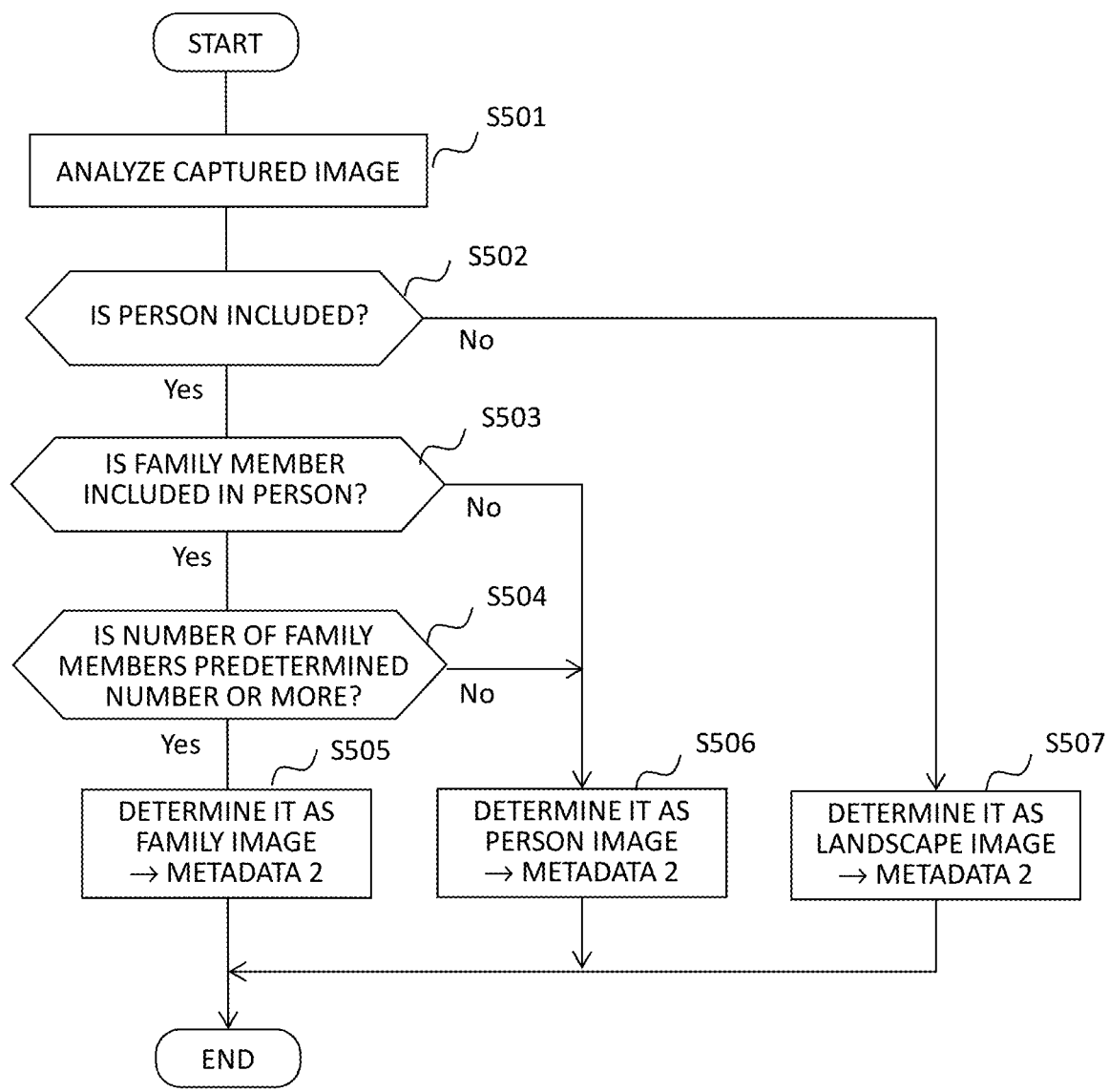
FIG. 10A is a flowchart illustrating an image analysis process.

FIG. 10A is a flowchart illustrating the details of the image analysis process (S404) of FIG. 9.

The captured image is analyzed by the image analysis executing unit 104*d* (S501). It is determined whether or not the captured image includes a person (S502). If it is determined that the captured image does not include a person, the captured image is determined to be a "landscape" image, and the metadata 2 is generated (S507).

When it is determined that the captured image includes a person, it is determined whether or not a family member is included in the person (S503). For the determination of the family, the family configuration table (T6) illustrated in FIG. 8B is used. The family configuration table has a face image link of a family, and it is determined whether or not the person included in the captured image matches the face image of the face image link destination of the family. This determination is sequentially performed on all family members registered in the family configuration table.

If it is determined that the family member is included in the captured image, it is determined whether or not the number of included family members is equal to or more than a predetermined number (S504). In other words, it is determined whether or not the number of persons whose face image matches is equal to or more than the "number of matched persons" of the family configuration table. If it is determined that the number of family members is equal to or more than the number of matched persons, it is determined that the captured image is a "family" image, and the metadata 2 is generated (S505).

When it is determined in S503 that a family member is not included in the captured image or when it is determined in S504 that the number of family members is less than the number of matched persons, the captured image is determined to be a "person" image, and the metadata 2 is generated (S506). Thereafter, the image analysis process, and the process proceeds to S405 of FIG. 9.

Figure 10B:
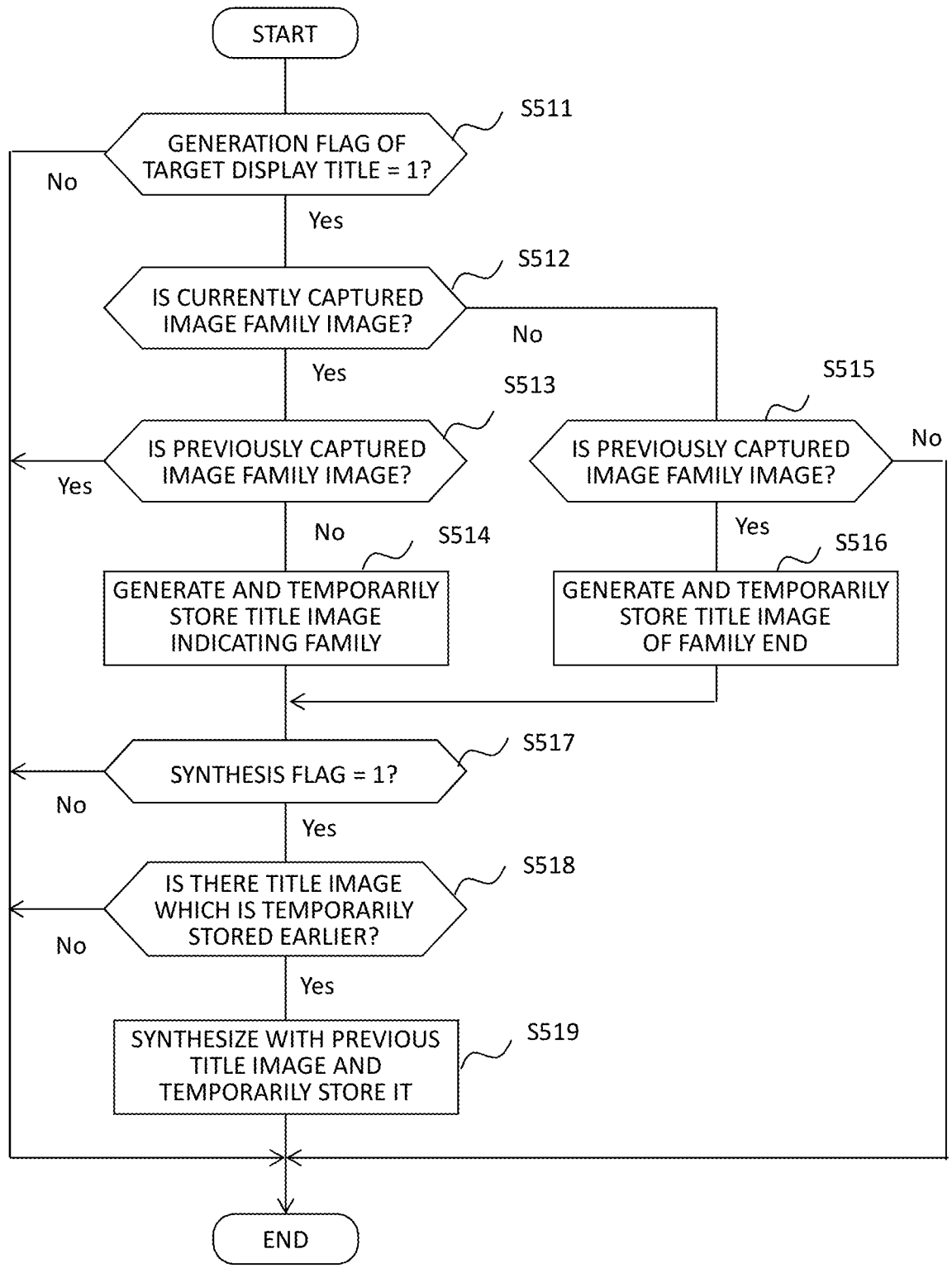
FIG. 10B is a flowchart illustrating a title image generation process.

FIG. 10B is a flowchart illustrating the details of the title image generation process (S408) of FIG. 9. The process is executed subsequently to S407 of FIG. 9. Here, a case in which the target display title is "family" will be described as an example. Incidentally, the same process applies to the display title "person" or "landscape."

It is determined whether or not the title image generation flag of "family" is set to 1 with reference to the title image control table (S511). When the generation flag is not set to 1, the present process ends.

When the generation flag is set to 1, it is determined whether or not the currently captured image is a "family" image from the metadata 1 and 2 of the currently captured image which is temporarily stored (S512). When it is determined that the current image is a family image, the process proceeds to S513, and when it is determined that the current image is not a family image, the process proceeds to S515.

In S513, it is determined whether or not the previous image is a family image from the metadata 1 and 2 of the previously captured image stored in the storage unit 110. When it is determined that the previously captured image is a family image, the present process ends. If it is determined that the previously captured image is not a family image, the title image is generated. In other words, a title image including a character indicating "family" is generated with a design (the image size or the like) corresponding the priority of "family" which is the display title and temporarily stored in the temporary storage region 104f of the memory unit 104 (S514). Incidentally, as the background image of the title image, a typical family image (an image of a family representative or all members) or a captured image of a family which is temporarily stored may be used. Then, the process proceeds to S517.

In S515, similarly to in S513, it is determined whether or not the previous image is a family image. When it is determined that the previously captured image is not a family image, the present process ends. When it is determined that the previously captured image is a family image, a title image is generated. However, in this case, a title image which has a design corresponding to the priority of the "family" and includes a character indicating "family end" is generated and temporarily stored in the temporary storage region 104f of the memory unit 104 (S516). Further, an image emphasizing "end" or the like may be synthesized as the background image of the title image. Then, the process proceeds to S517.

In S517, it is determined whether or not the title image synthesis flag of the title image control table is set to 1. When the synthesis flag is not set to 1, the present process ends. When the synthesis flag is set to 1, it is determined whether or not there is a title image with a higher priority which is generated earlier and temporarily stored in the memory unit 104 (S518). If there is no title image which is previously temporarily stored, the present process ends. When there is a title image which is previously temporarily stored, the previously generated title image and the currently generated title image are synthesized and temporarily stored in the memory unit 104 (S519). In the synthesis of the title image, an upper-lower arrangement relation or a character size is different in accordance with a priority. Thereafter, the title image generation process ends, and the process shifts to S409 of FIG. 9.

FIGS. 11A and 11B illustrate various types of generation examples of the title image. FIG. 11A illustrates the cases of (T7) to (T9) as the examples of the title image control table. Here, the item of the title image generation flag=0 is partially omitted. FIG. 11B illustrates an example of the title image generated in accordance with each of these control tables.

In an (initial state) of FIG. 11B, a state in which, when two captured images P4 and P5 are stored in the storage unit 110 together with the metadata 1 and 2, the imaging process is newly executed, and a captured image P6 and the metadata 1 and 2 are temporarily stored in the temporary storage region 104f of the memory unit 104 is assumed. In this case, the image P5 is the previous image, and the image P6 is the current image. Information of the photographing date and time and the photographing place which are the metadata 1 and an image analysis result (a family, a person, and a landscape) which is the metadata 2 are written below each image. A method of generating the title image in accordance with each title image control table of FIG. 11A at this time will be described.

In the case of the control table (T7), a priority is given in the order of "family," "person," and "year," the title image generation flag is 1, and the title image synthesis flag is 0. In this case, since the image analysis result of the previously captured image (P5) is "person," the image analysis result of the currently captured image (P6) is "family," and also the photographing year is different, three title images, that is, the title image 31 of "family," the title image 32 of "person end," and the title image 33 of "year" are generated in accordance with the priority. Since the synthesis flag is 0 in all, the synthesis of the title image is not performed.

In the case of the control table (T8), the title image synthesis flag of "person" is set to 1 in the control table (T7), and the title images 31 and 32 of "family" and "person end" are synthesized.

In the case of the control table (T9), the title image generation flag in the control table (T7) is 1 in "person." In this case, since the previously captured image is "person," and the currently captured image (P6) is "family," only the title image 32 of "person end" corresponding to a priority 2 is generated.

As described above, in the present embodiment, it is possible to generate the title image of the hierarchical structure having the priority set in the title image control table with reference to the metadata 2 generated with the image analysis result of the captured image as well. Therefore, it is possible to increase the type of display title and classify and organize a plurality of captured images into more usable items.

Third Embodiment

In a third embodiment, a method of searching for a captured image stored in the storage unit 110 will be described. In order to search for a captured image efficiently, in the present embodiment, a search is executed as follows using the image search executing unit 104e configured in a memory unit 104.

FIG. 12 is a diagram illustrating an example of a display screen at the time of image search. (a) illustrates a list display state of the captured image, and the title image is inserted into a delimiter position of a captured image 10. Here, title images 21, 22, and 23 are hierarchically generated in accordance with the priorities of "year," "season," "month" in accordance with the title control table (T1) of FIG. 7A. Further, the synthesis of the title image is not performed. The user selects a search target through the operating unit 140 by, for example, tapping a desired title image. At this time, since the size or the like of the title image is changed in accordance with the priority, the title image with the higher priority can be easily identified and selected.

(b) is a case in which the title image 21 of "2016" is selected, and the captured images (a target range indicated by a dashed line 21a) included in the title image of "2016" is highlighted and displayed. (c) is a case in which the title image 22 of "spring" is selected (a target range 22a), and (d) is a case in which the title image 23 of "March" is selected (a target range 23a). As described above, the captured image belonging to the selected title image is displayed more emphatically than the other images, so that the user can quickly search for a desired image.

In the case of FIG. 12, the captured images are arranged chronologically, and thus when the search is performed by "year," the range of target images is continuous, so that it is easy to search. On the other hand, when the search is performed by "spring" or "March," the range of target images is dispersed due to a difference of "year," so that it is difficult to search when the search is performed across different "years." In this regard, a technique of changing the priority of the title image and rearranging the captured images will be described.

FIG. 13 is a diagram illustrating an example of changing the priority and rearranging the captured images. (a) is a list display when the title image 21 of "year" is given the highest priority, and is an arrangement similar to that of FIG. 12(a). On the other hand, (b) is a list display when the title image 22 of "season" is changed to have the highest priority. At this time, the user performs, for example, an operation of dragging the position of the title image 22 of "spring" in the screen of (a) so that the position of the title image 22 of "spring" and the position of the title image 21 of "2016" are switched.

When the drag operation of the user is detected, the title generation executing unit 104c changes the priority flag of "season" and the priority flag of "year" in the current title image control table (T1) to 1 and 2 and generates a title image corresponding to a new priority. Then, a process (sorting process) of rearranging the order of the captured images stored in the storage unit 110 in accordance with the new priority is performed. In the rearrangement process, it is possible to treat a group of images classified by title image generated in (a) as a group, and thus it is possible to process them in a short time without referring to metadata of each image one by one. As in the result (b), captured images across different "years" are consecutively arranged in a new title image 22' of "spring" (indicated by a dashed line 22a'), and thus the user can search easily.

Although several embodiments of the present invention have been described above, it is obvious that the configuration for realizing the technology of the present invention is not limited to the above embodiments, and various types of modifications can be considered. For example, in the above embodiments, the title image is generated at a timing at which photographing is performed by the imaging apparatus, but a plurality of pieces of photographing data may be analyzed after the photographing is completed, and the title image may be generated in accordance with the title image control table and inserted as the delimiter image. Further, the numerical values or the like appearing in the description and the drawings are merely examples, and the effects of the present invention are not impaired even though different numerical values are used.

The functions or the like of the present invention described above may be realized by hardware by designing some or all of the functions, for example, by an integrated circuit. Also, the functions or the like of the present invention described above may be realized by software as a microprocessor unit or the like interprets and executes a program that realizes the respective functions or the like. Hardware and software may be used together.

REFERENCE SIGNS LIST

10: Captured image
11 to 13, 21 to 25, 31 to 33: Title image
100: Imaging apparatus
104: Memory unit
104c: Title generation executing unit
104d: Image analysis executing unit
104e: Image search executing unit
104f: Temporary storage region
110: Storage unit
110a: Information/data storage region
121: Display unit
123 to 125: Imaging unit (camera)
140: Operating unit

The invention claimed is:
1. An imaging apparatus, comprising:
a camera that captures images of a subject;
a storage;
a display;
a processor;
wherein the processor is configured to:
generate title images each including a display title, separately from the captured images, for classifying the captured images acquired by the camera;
store the captured images and the title images in the storage; and
instruct the display to display the captured images and the title images stored in the storage in the form of a list,
wherein the processor hierarchically generates the title images in accordance with a priority set in each type of display title for classifying the captured images,
wherein the processor controls the display to display the captured images,
wherein the processor further controls the display to display the title images inserted between the captured images in accordance with the priority, and
wherein the title images are displayed simultaneously with and adjacent to at least one captured image corresponding to the title image.
2. The imaging apparatus according to claim 1,
wherein the storage stores a title image control table in which the type of the display title when a title image of the title images is generated and the priority of the display title are described, and the processor generates the title image having a different design in accordance with the described priority with reference to the title image control table.

3. The imaging apparatus according to claim 2, wherein the different design of the title image differs in at least one of a size of the image, a character size in the image, a background color of the image, and a resolution of the image.

4. The imaging apparatus according to claim 2, wherein the title image control table further includes a title image generation flag indicating whether or not the title image is displayed for each display title and a title image synthesis flag indicating whether or not the title image is generated by synthesis with other types of title images generated earlier.

5. The imaging apparatus according to claim 2, wherein the processor is configured to compare a previously captured image with a currently captured image and generate the title image when photographing dates and times or imaging places of the respective captured images are different as the type of the display title.

6. The imaging apparatus according to claim 5, wherein the processor is configured to:

identify a type of subject in the captured image; and generate the title image when the type of the subject identified by the image analysis executing unit is different as the type of the display title.

7. The imaging apparatus according to claim 6, wherein, when there is a person in the captured image as the type of the subject, the display title is made different depending on whether or not a family is included in the person.

8. The imaging apparatus according to claim 1, wherein the processor is configured to search for a desired captured image from the captured images and the title images displayed on the display in the form of the list.

9. The imaging apparatus according to claim 8, wherein, when a title image of the title images displayed on the display in the form of the list is selected by a user, the processor highlights and displays the captured images classified by the selected title image.

10. The imaging apparatus according to claim 9, wherein, when an operation to change the priority of the title image displayed on the display in the form of the list is received from the user, the processor rearranges the captured images in accordance with a new title image and displays the captured images on the display in the form of a list when the new title image is generated in accordance with a new priority.

* * * * *